United States Patent
Scott

(10) Patent No.: US 7,766,228 B2
(45) Date of Patent: Aug. 3, 2010

(54) SYSTEM FOR SALE OF CONSUMER GOODS

(75) Inventor: Nicholas Arthur Scott, Minden (DE)

(73) Assignee: Vensafe ASA, Gressvik (NO)

( * ) Notice: Subject to any disclaimer, the term of this patent is extended or adjusted under 35 U.S.C. 154(b) by 0 days.

(21) Appl. No.: 10/505,235

(22) PCT Filed: Feb. 21, 2003

(86) PCT No.: PCT/NO03/00067

§ 371 (c)(1),
(2), (4) Date: Aug. 19, 2004

(87) PCT Pub. No.: WO03/071497

PCT Pub. Date: Aug. 28, 2003

(65) Prior Publication Data

US 2005/0102182 A1    May 12, 2005

(30) Foreign Application Priority Data

Feb. 22, 2002 (NO) .................................. 20020893
Feb. 25, 2002 (NO) .................................. 20020905
Apr. 10, 2002 (NO) .................................. 20021679

(51) Int. Cl.
*G07F 7/00* (2006.01)
*G07F 7/12* (2006.01)
(52) U.S. Cl. ............................. 235/381; 705/26; 705/28
(58) Field of Classification Search .................. 235/301, 235/381; 345/173; 705/26, 28; 396/564
See application file for complete search history.

(56) References Cited

U.S. PATENT DOCUMENTS

| | | | |
|---|---|---|---|
| 3,824,544 A | | 7/1974 | Simjian |
| 4,767,917 A | | 8/1988 | Ushikubo |
| 5,091,713 A | * | 2/1992 | Horne et al. ................. 340/541 |
| 5,431,250 A | * | 7/1995 | Schlamp ....................... 186/55 |
| 5,499,707 A | * | 3/1996 | Steury ......................... 194/217 |
| 5,769,269 A | * | 6/1998 | Peters ............................ 221/7 |
| 5,902,984 A | * | 5/1999 | Planke ......................... 235/381 |
| 5,933,814 A | * | 8/1999 | Rosenberg ................... 705/26 |
| 6,101,483 A | * | 8/2000 | Petrovich et al. ............. 705/26 |
| 6,123,223 A | * | 9/2000 | Watkins ...................... 221/121 |
| 6,193,154 B1 | * | 2/2001 | Phillips et al. .............. 235/381 |
| 6,281,886 B1 | * | 8/2001 | Ranieri ....................... 345/173 |

(Continued)

FOREIGN PATENT DOCUMENTS

WO    WO 94/01838    1/1994

*Primary Examiner*—Evens J Augustin
(74) *Attorney, Agent, or Firm*—Rodman & Rodman

(57) ABSTRACT

A system for the sale of consumer goods, wherein the system comprises a device for providing a customer with a non-validated token that represents an article of merchandise. The article is to be paid for by the customer at a checkout unit when the token is checked by said unit. Said checkout unit has a means for providing a validated token that bears a transaction code. Said checkout unit has a means for communicating with an article dispensing device and providing the article dispensing device with said transaction code after the article has been paid for. The validated token is used to obtain the purchased article from the article dispensing device with the aid of a comparator device within the article dispensing device which compares the transaction code on the validated token with the transaction code communicated by said communication device, wherein the article dispensing device delivers the purchased article when there is a defined code correspondence.

30 Claims, 1 Drawing Sheet

U.S. PATENT DOCUMENTS

| | | |
|---|---|---|
| 6,354,495 B1 | 3/2002 | Powell |
| 6,393,339 B1 * | 5/2002 | Yeadon .................. 700/237 |
| 6,439,345 B1 * | 8/2002 | Recktenwald et al. ......... 186/55 |
| 6,625,581 B1 * | 9/2003 | Perkowski .................. 705/27 |
| 6,629,080 B1 * | 9/2003 | Kolls ........................ 705/26 |
| 6,954,732 B1 * | 10/2005 | DeLapa et al. ............... 705/14 |
| 7,035,814 B2 | 4/2006 | Malkin et al. |
| 7,114,650 B2 | 10/2006 | Sherrod |
| 7,533,044 B2 | 5/2009 | Scott |
| 2001/0033752 A1 * | 10/2001 | Cook et al. ................. 396/564 |
| 2001/0037207 A1 * | 11/2001 | Dejaeger ...................... 705/1 |
| 2002/0095343 A1 | 7/2002 | Barton et al. |
| 2002/0097715 A1 * | 7/2002 | Roerick ..................... 370/389 |

* cited by examiner

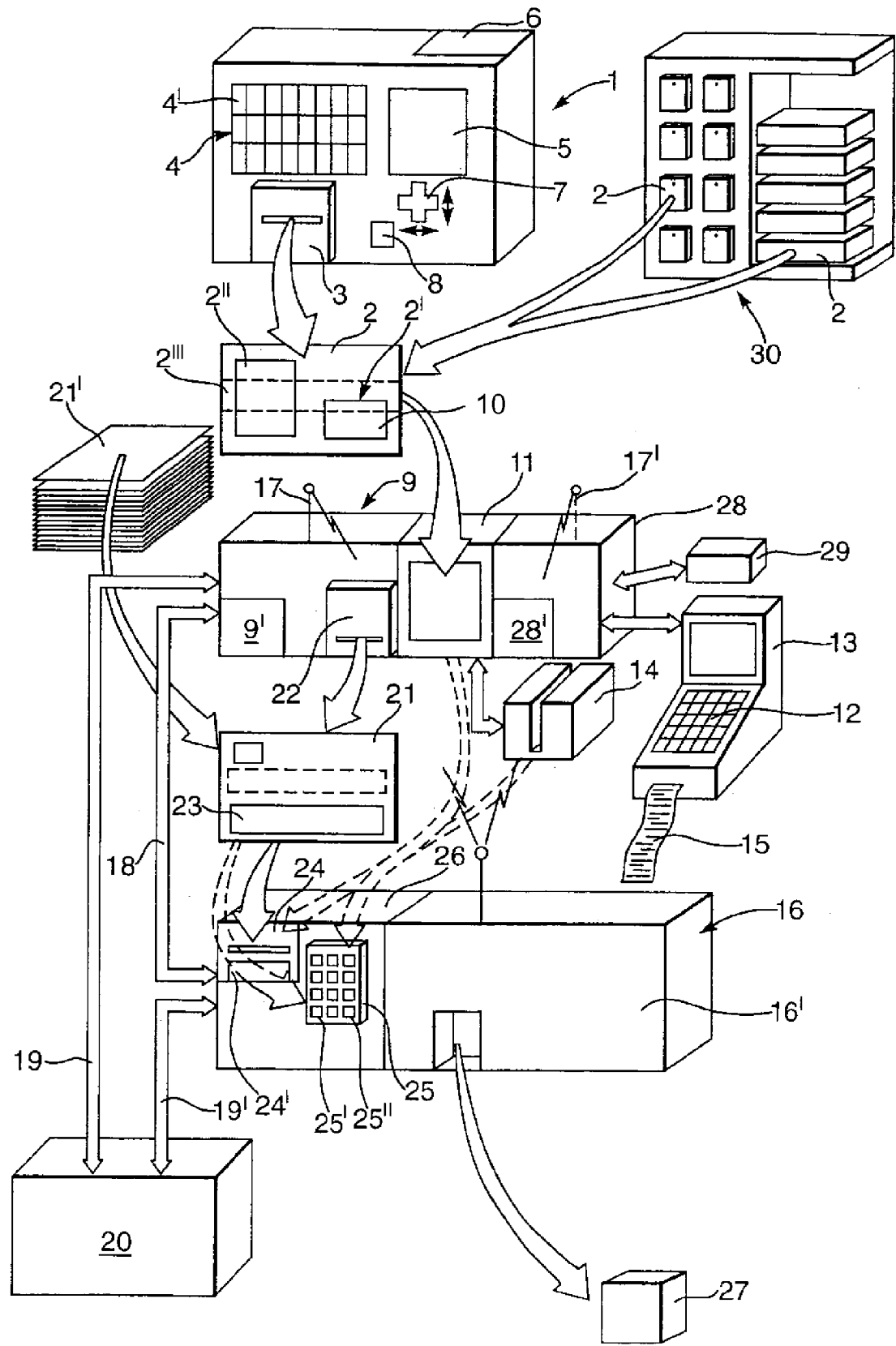

SYSTEM FOR SALE OF CONSUMER GOODS

The present invention relates to a system for the sale of consumer goods, wherein the system is designed to provide a customer with a non-validated token that represents an article of merchandise, wherein the said article is to be paid for by the customer at a checkout unit when the token is checked by said unit, the said checkout unit having a device for communicating with an article dispensing device and providing the article dispensing device with a first transaction code after the article has been paid for, and a device for providing the customer with a validated token which bears a second transaction code, wherein the said validated token is to be used to obtain the purchased article from the article dispensing device with the aid of a comparator device within the article dispensing device which compares the transaction code on the validated token as entered in the comparator device with the transaction code that has been communicated by said communication device, and delivery of the article when there is a defined code correspondence.

A previously known system of this type is described in U.S. Pat. No. 5,902,984, wherein a non-validated token bears both data related to article number and a card serial number which is unique to the individual token. Such tokens are normally displayed on a stand from which the customer may choose the token that represents the article he intends to buy.

However, in the previously known system the article number may change from time to time because of a changed type of a particular article, a new brand or a new product variant, or a correction that has been made to the serial number of the article. This means that previously issued, non-validated tokens on a stand may not be recognisable when they are taken to a control unit. Moreover, frequent pre-printing and replacement of tokens are costly operations.

Therefore, one of the objects of the invention is to provide a system which avoids these disadvantages, but which still maintains the desired advantages of the previously known system, in addition to other new features provided by the present invention.

According to the invention, the system is characterised in: that the validated token bears a transaction code selected from
the group consisting of:
  a serially generated transaction code,
  a randomly generated transaction code,
  a pre-determined series of transaction codes, and
  a unique token number generated serially or randomly by said providing device; and
that the validated token is either
  a) the non-validated token provided with the transaction code through processing in the checkout unit, or
  b) a replacement token issued by the checkout unit from a token dispenser, from a token printer, or from a supply of pre-made, non-alterable, reusable, revalidatable and machine-readable tokens.

According to the invention, the system is designed to provide the non-validated token by means of a printer which is controlled by a selection panel that displays articles for which a non-validated token can be printed on the activation thereof.

Alternatively, the non-validated tokens can be provided from a ready supply of such, different tokens, as is known per se. Although it is known from U.S. Pat. No. 5,902,984 to use cards as tokens, it is possible according to the invention to use, for example, packaging without its contents as a non-validated token, so that the product or article that belongs to the packaging can be dispensed from the article dispensing device.

According to further features of the system according to the invention, the non-validated token bears information related to the article type. The article type information is selected from the group consisting of: a numerical code, a bar code, an EAN code, a UPC code, a magnetically readable code, a manually interpretable article identification code. In addition, the article type information is selectable from the group consisting of: animation of the article, article name, article price, a unique token number.

The transaction code that is provided on the validated token is selected from the group consisting of:
a numerical code, a bar code, an EAN code, a UPC code, a magnetically readable code, an rf label readable code, a series of numbers, a series of letters, a series of a combination of numbers and letters, at least one row of punched holes, a programmable IC chip, a pre-programmed IC chip.

The communication between the checkout unit and the article dispensing device may be of one or more embodiments, depending on the installation facilities. Advantageously, the communication type is selected from the group consisting of:
  ultrasound transmission,
  electro-optical transmission,
  rf transmission,
  bluetooth transmission
  wired transmission,
  transmission via a retailer's or trader's central computer unit and general merchandise transaction
  control unit.

In one particular embodiment, the checkout unit comprises or is connected to a transaction code encoder device, the checkout unit comprising an article type information scanner device, wherein the said scanner device is for communicating said information to the encoder device, the said checkout unit communicating with the article dispensing device via said token encoder device, wherein the said token encoder device relays said information to a cash register in said checkout unit for processing during a payment receipt operation, and said token encoder means also has a control unit for controlling a printer which issues the validated article token, and a device for transmitting said communication to the article dispensing device.

The transaction code on the validated token is entered in the comparator device through machine reading of the transaction code, said machine being selected from the group consisting of:
  OCR reader;
  optical scanner for scanning a bar code or an EAN code;
  an electromagnetic magnetic strip reader;
  an IC chip reader;
  a punched hole reader;
  an rf label code reader.

In one alternative to the machine reading, the article dispensing device has a manually operated keypad, keyboard or touch screen for input into the comparator unit of a manually readable transaction code on the validated token.

Said first and second transaction codes may be the same codes or the codes may be related to each other, e.g., complementary codes, symmetrical codes or unsymmetrical codes.

The aforementioned selection panel may optionally consist of a touch screen.

The invention will now be described with reference to the attached drawing.

The system has a unit 1 which provides or issues a customer with a non-validated token 2 from a printer 3 which is controlled by a selection panel 4 that displays articles for which the non-validated token can be printed on activation of one of the panel elements 4', each element representing an article of merchandise. As an alternative, a selection panel in the form of a display panel 5, e.g., of the LCD type, can show the various selectable articles that are stored in a memory 6. A pointer- or cursor-based two-way or four-way multifunction switch 7 can be used to enable the customer to move a cursor or pointer on the display panel and, on depression thereof or activation of a separate switch 8, to cause the desired article to be chosen and a non-validated token to be printed by the printer. As a further alternative, the selection panel may be in the form of a large-dimension LCD display or touch screen.

As another alternative or as a supplement, non-validated tokens 2 can be provided from a ready supply 30 of such, different tokens, as known per se from said U.S. Pat. No. 5,902,984. Although it is known from U.S. Pat. No. 5,902,984 to use cards as tokens, it is possible according to the invention to use, for example, packaging without its contents as a non-validated token, so that the actual product or article belonging to the packaging can be dispensed from the article dispensing device. This is of course suitable for very expensive articles such as perfume and dear cosmetics, compact discs (CDs) and other expensive consumer goods, particularly of the type that are easily stolen in a shop environment. The tokens 2 in the supply 30 may, for example, consist of cards, as known and shown to the left in the supply 30 or may be packaging as shown to the right in the supply and in any form whatsoever.

The non-validated token 2 bears an information section 2' which is related to the article type information 10. Such information 10 may be represented on the token in a form selectable from the group consisting of: a numerical code, a bar code, and EAN code, a UPC code, a magnetically readable code, a manually interpretable article identification code. The token may also be provided in a section 2" with additional information selected from the group consisting of: animation of the article, article name, article price, a unique token number. If a unique token number is provided on the token, the number can be generated serially or randomly by said unit 1.

The non-validated token 2 is then taken by the customer to a checkout unit 9 for checking the non-validated token 2 as regards its article type information or article code 10. This check will advantageously be done by using a standard optical scanner 11 which is permanently installed or hand-operated. However, it will of course be possible to read the article code manually and enter this via a keypad 12 on a cash register 13 or by using a magnetic strip reader (decoder) and encoder 14. When the checking is done, the value of the article is added to the bill that is issued by the cash register 13.

The checkout unit 9 has different devices for communicating with an article dispensing device 16 in order to provide the article dispensing device with a transaction code after payment for the article has been made. A communication method of this kind may be via one or more of the following: wireless transmission 17, 17', such as ultrasound transmission, electro-optical transmission, rf transmission, bluetooth transmission (i.e., short-range radio transmission); wired transmission 18; and transmission 19, 19' via a combined central trader computer and general merchandise transaction control unit 20.

The customer may be provided with a validated token 21 that is printed by a dispenser or printer 22 in the checkout unit 9, the said token 21 bearing a transaction code 23 that is the same as or related to the code communicated from the checkout unit 9 to the article dispensing device 16.

Alternatively, it may be possible to reuse tokens which a) bear a transaction code that is unique to a particular token; b) have been processed in the article dispensing device and have thus been non-validated; and c) have been placed in a supply of such non-validated tokens 21' irrespective of the order in which the transaction codes appear from one token to the next. Revalidation of reusable tokens 21' can be done, e.g., by scanning the transaction code on a token and relating the code to the transaction code that is communicated to the article dispensing device 16, wherein the transaction code communicated to the article dispensing device in any case also has information added that is related to the type and the number of the articles that are bought and paid for, and consequently will be handed to the customer when he presents a validated token 21. Scanning a token of this kind could be done optically if the reusable token 21' bears an optically readable code, e.g., readable by means of said scanner 11. If based on magnetic strip reading, the reader 14 could be used. It is also conceivable that rf label technology may be used for such reusable tokens. However, this requires an rf label code reader 29 at the checkout unit 9.

No matter what type of scanning is required to read a code on a reusable token 21', the token reader 24 within the article dispensing device 16 must be capable of reading the code on the validated token 21 that is entered in such a reader. If rf label technology is used, non-readability of such an rf label based token outside the dispensing device is required as the token must be inserted into the reader, processed and kept by the dispensing device for later re-use.

The validated token 21 (e.g., based on a reusable token, an originally issued token or a substitute token) is used to obtain the bought (and paid for) article from the article dispensing device 16.

When a validated token 21 is introduced into token reader 24 on the dispensing device 16, or when the transaction code 23 shown on the token 21 is entered via a keypad 25, the said keypad also having "cancel" 25' and "enter" key 25", a comparator device 26 in the article dispensing device 16 compares the transaction code on the validated token as entered in the comparator device 26 with the transaction code that is communicated by said communication device. If a code correspondence is found according to the pre-determined criteria, the dispensing device 16 delivers the article 27 to the customer via the delivery part 16' therein.

Of course, if the transaction code on the validated token is on an rf label, it will not be absolutely necessary to introduce the validated token into the token reader 24, as the token reader may in this case be equipped with an rf label reader 24' which is also capable of detecting the transaction code on the validated token when this is on the outside of the article dispensing device 16. This is a situation which may be suitable if the rf label is on the packaging.

If the transaction code is presented in the form of a bar code or an EAN code, it is conceivable that this can be read by an optical scanner which has its field of view facing out from the outside of the device 16. This reader is indicated symbolically by the reader 24'.

The transaction code as relayed to the dispensing device 16, and which is present on the validated token 21, is selected from the group consisting of: a serially generated transaction code, a randomly generated transaction code, and said unique token number. Moreover, the transaction code that is provided on the validated token is advantageously selected from the group consisting of: a numerical code, a bar code, an EAN code, a UPC code, a magnetically readable code, an rf label readable code, a series of numbers, a series of letters, a series of a combination of numbers and letters, at least one row of punched holes, a programmable IC chip, a pre-programmed IC chip.

However, it is conceivable that a validated token is in fact the non-validated token 2 provided with the transaction code through processing in the checkout unit 9. Such processing could, e.g., take place by using the magnetic encoder 14 to code the magnetic strip 2''' on the token 2. Alternatively, a person operating the checkout unit 9 is could use the unique token number, if one is present, printed on the token 2 as a transaction number and enter it manually via the keypad 12.

It is also possible that a readable transaction code can be provided on the validated token in the checkout unit when this token, for example, consists of packaging, such as a box, a wrapping or the like. This means that also the non-validated token consists of this packaging, but is validated in the checkout unit. After validation, the customer may thus take the packaging, which then forms or bears the validated token, to the article dispensing device 16, have the transaction code read there, or enter it himself, whereupon the transaction code becomes invalid at the same time as the article or product is delivered to the customer. In such a case, the transaction code could, for example, be applied to the packaging using a sticky label, or the transaction code could be uncovered by the removal of a cover sheet or cover strip on the packaging. Of course, it is also possible that the transaction code could be transmitted wirelessly to, for example, an rf label that has been applied or fastened to the packaging.

However, it is most preferable that the validated token 21 should be a substitute token that is issued by the printer or the token dispenser 22.

It will be noted from the attached drawing that the checkout unit 9 comprises or is connected to a transaction code encoder device 28. As described above, the checkout unit 9 is associated with said scanner 11, the scanner 11 being capable of communicating the article type information to the transaction code encoder device 28. Thus, in one particular embodiment, it may be preferable to permit said checkout unit 9 to communicate with the article dispensing device 16 via said transaction code encoder device 28, e.g. via wireless transmission 17'. Said encoder device 28 transmits said information to the cash register 13 which communicates with the checkout unit 9 for processing in a payment receipt operation for addition to the bill 15. The encoder device 28 may also have a control unit 28', for controlling the printer 22 that issues the validated article token 21.

The token reader 24 may be of any chosen type to enable reading in a machine readable form of the transaction code that is the provided on the token 21, thus, e.g., a machine selected from the group consisting of:
an OCR reader;
an optical scanner for scanning a bar code or an EAN code;
an electromagnetic magnetic strip reader;
an IC chip reader;
a punched hole reader; and
an rf label code reader.

If the validated token, whether the token 21 or the original, but later validated token 2, has a manually readable transaction code, e.g., a series of numbers, the manually operated keypad or keyboard 25 can be used to enter the transaction code on the validated token in the comparator device 26.

The invention claimed is:

1. A system for the sale of consumer goods comprising,
a) an article token selection panel device activatable by a customer, the device displaying different articles of merchandise or representations thereof selectable by a customer upon activation of the device,
b) a printer controlled by the article token selection panel device for providing a customer with a non-validated token that corresponds to an article of merchandise selected by the customer, when the article token selection panel device is activated by the customer,
c) the printer having means for printing the non-validated token with article identifying information for the article of merchandise selected by the customer upon activation of the article token selection panel device,
d) said article identifying information including information related to a unique token number and the type of article of merchandise selected by the customer, and wherein the unique token number is selected from the group consisting of,
  (i) a serially generated code,
  (ii) a randomly generated code,
  (iii) a predetermined series of codes, and
  (iv) a unique token number generated serially or randomly,
e) a checkout unit having,
  (i) checking means for checking the article-identifying information on the non-validated token,
  (ii) payment receiver means for receiving payment from the customer for the article of merchandise identified by the article identifying information on the non-validated token,
  (iii) generator means for generating a first transaction code after payment for the article has been received, and
  (iv) validated token provider means for providing the customer with a validated token having a second transaction code,
    a unique token number generated serially or randomly wherein the unique token number provided on the non-validated token constitutes the second transaction code on the validated token,
f) an article dispensing device in communication with said checkout unit for receiving the first transaction code generated by the checkout unit after the article of merchandise has been paid for at the checkout unit, and
g) a comparator cooperable with the article dispensing device and having means for comparing the first transaction code with the second transaction code on the validated token, and when there is a predetermined code correspondence, enabling said article dispensing device to dispense the article of merchandise for access by the customer.

2. A system for the sale of consumer goods comprising,
a) an article token selection panel device activatable by a customer, the device displaying different articles of merchandise or representations thereof selectable by a customer upon activation of the device,
b) the article token selection panel device having a non-validated token provider means for providing a customer with a non-validated token that corresponds to an article of merchandise selected by the customer, when the article token selection panel device is activated by the customer,
c) the non-validated token having article identifying information for the article of merchandise) selected by the customer upon activation of the article token selection panel device,
d) said article identifying information including information related to a unique token number and the type of article of merchandise selected by the customer,
e) a checkout unit having, (i) checking means for checking the article-identifying information on the non-validated token,
(ii) payment receiver means for receiving payment from the customer for the article of merchandise identified by the article identifying information on the non-validated token,
(iii) generator means for generating a first transaction code after payment) for the article has been received, and
(iv) validated token provider means for providing the customer with a validated token that substitutes for or supplements the non-validated token, said validated token having a second transaction code selected from the group consisting of,
  a serially generated code,
  a randomly generated code,
  a predetermined series of codes, and
  a unique token number generated serially or randomly by the article token selection panel device which provides such number on the non-validated token,
f) the validated token provided by said checkout unit being deliverable from one of,
  a token dispenser,
  a token printer, and
  a supply of pre-made, reusable, revalidatable and machine-readable tokens,
g) an article dispensing device in communication with said checkout unit for receiving the first transaction code generated by the checkout unit after the article of merchandise has been paid for at the checkout unit, and
h) a comparator cooperable with the article dispensing device and having means for comparing the first transaction code with the second transaction code on the validated) token, and when there is a predetermined code correspondence, enabling said article dispensing device to dispense the article of merchandise for access by the customer.

3. A system for the sale of consumer goods comprising,
a) an article token selection panel device activatable by a customer, the device displaying different articles of merchandise or representations thereof selectable by a customer upon activation of the device,
b) the article token selection panel device having a non-validated token provider means for providing a customer with a non-validated token in the form of packaging or a part thereof of an article of merchandise selected by the customer, when the article token selection panel device is activated by the customer,
c) the non-validated token having article identifying information thereon for the article of merchandise selected by and to be dispensed to the customer
d) said article identifying information including information related to a unique token number and/or the type of article of merchandise selected by the customer,
e) a checkout unit having,
  (i) checking means for checking the article-identifying information on the non-validated token,
  (ii) payment receiver means for receiving payment from the customer for the article of merchandise identified by the article identifying information on the non-validated token,
  (iii) generator means for generating a first transaction code after payment for the article has been received, and
  (iv) validated token provider means for providing the customer with a validated token having a second transaction code obtained in a manner selected from one in the group consisting of,
    applying the second transaction code to the packaging of the article of merchandise that is to be dispensed to the customer or said part of the packaging,
    transmitting the second transaction code to the packaging of the article of merchandise that is to be dispensed to customer or said part of the packaging, and
    revealing the second transaction code by uncovering an area on the packaging of the article of merchandise that is to be dispensed to the customer or on said part of the packaging,
f) an article dispensing device in communication with said checkout unit for receiving the first transaction code generated by the checkout unit after the article of merchandise has been paid for at the checkout unit, and
g) a comparator cooperable with the article dispensing device and having means for comparing the first transaction code with the second transaction code on the validated token, and when there is a predetermined code correspondence, enabling said article dispensing device to dispense the article of merchandise for access by the customer.

4. A system for the sale of consumer goods comprising,
a) an article token selection panel device activatable by a customer, the device displaying different articles of merchandise or representations thereof selectable by a customer upon activation of the device,
b) the article token selection panel device having a non-validated token provider means for providing a customer with a non-validated token configured as packaging or a part thereof of an article of merchandise selected by the customer, when the article token selection panel device is activated by the customer,
c) the non-validated token having article identifying information for the article of merchandise selected by and to be dispensed to the customer, the article identifying information including at least one of
  (i) the packaging of the article of merchandise that is to be dispensed to the customer,
  (ii) a part of said packaging,
  (iii) a unique token number, and
  (iv) the type of article of merchandise selected by the customer,
d) a checkout unit having,
  (i) checking means for checking the article-identifying information on the non-validated token,
  (ii) payment receiver means for receiving payment from the customer for the article of merchandise identified by the article identifying information on the non-validated token,
  (iii) means for generating a first transaction code after payment for the article has been received, and
  (iv) means for providing the customer with a validated token having a second transaction code by validating the non-validated token in a manner selected from one of the group consisting of,
    applying the second transaction code to the packaging of the article of merchandise that is to be dispensed to the customer or said part of the packaging,
    transmitting the second transaction code to the packaging of the article of merchandise that is to be dispensed to the customer or said part of the packaging, and
    revealing the second transaction code by uncovering an area on the packaging of the article of merchandise that is to be dispensed to the customer or on said part of the packaging, e) an article dispensing device in communication with said checkout unit for receiving the first transaction code generated by the checkout unit after the article of merchandise has been paid for at the checkout unit, and f) a comparator cooperable with the article dispensing device and having means for comparing the first transaction code with the second transaction code on the validated token, and when there is a predetermined code correspondence, enabling said article dispensing device to dispense the article of merchandise for access by the customer.

5. A system as disclosed in claim 2, wherein said non-validated token provider means of said device is a printer which is controlled by a selection panel that displays articles for which a non-validated token can be printed on activation thereof, and wherein the non-validated token carries article type information selected from the group consisting of: a numerical code, a bar code, an EAN code, a UPC code, a magnetically readable code, an rf label readable code, a manually interpretable article identification code, animation of the article, article name, and article price.

6. A system as disclosed in claim 1, wherein the article type information is selected from the group consisting of: a code, a bar code, an EAN code, a UPC code, a magnetically readable code, an rf label readable code, and a manually interpretable article identification code.

7. A system as disclosed in claim 6, wherein the article type information is additionally selected from the group consisting of: animation of the article, article name and article price.

8. A system as disclosed in claim 1, wherein the second transaction code is selected from the group consisting of:
a numerical code, a bar code, an EAN code, a UPC code, a magnetically readable code, an rf label readable code, a series of numbers, a series of letters, a series of a combination of numbers and letters, at least one row of punched holes, a programmable IC chip, and a pre-programmed IC chip.

9. A system as disclosed in claim 1, wherein communication between the checkout unit and the article dispensing device is selected from the group consisting of:
ultrasound transmission,
electro-optical transmission,
rf transmission,
bluetooth transmission
wired transmission,
transmission via a retailer's or trader's central computer unit, and general merchandise transaction control unit.

10. A system as disclosed in claim 1, wherein the checkout unit includes a transaction code encoder device and a scanner device for scanning the non-validated token, wherein said scanner device is for communicating information to the encoder device, the checkout unit communicating with the article dispensing device via said token encoder device, wherein the token encoder device transmits said information to a cash register in said checkout unit for processing during a payment receipt operation, and wherein the encoder device also has a control unit for controlling a transmitting device to transmit said first transaction code communication to the article dispensing device.

11. A system as disclosed in claim 1, wherein the second transaction code on the validated token is entered in the comparator device through machine reading of the second transaction code, said machine being selected from the group consisting of:
OCR reader,
optical scanner for scanning a bar code or an EAN code,
an electromagnetic magnetic strip reader,
an IC chip reader,
a punched hole reader, and
an rf label code reader.

12. A system as disclosed in claim 1, wherein the article dispensing device has a manually operated device selected from the group consisting of a keypad, keyboard and touch screen for input of a manually readable second transaction code on the validated token into the comparator unit.

13. A system as disclosed in claim 1, wherein the first transaction code which is communicated to the article dispensing device and the second transaction code provided on the validated token are the same codes or codes that are related to each other, and selected from the group consisting of complementary codes, symmetrical codes and unsymmetrical codes.

14. A system as disclosed in claim 1, wherein the selection panel on the selection panel device is a touch screen.

15. A system as disclosed in claim 1, wherein the validated token includes the packaging for the article that is to be dispensed or a part of said packaging.

16. A system as disclosed in claim 2, wherein the validated token includes the packaging for the article that is to be dispensed or a part of said packaging and wherein said second transaction code on the validated token is on the processing thereof in the checkout unit applicable to the packaging or part thereof, transmittable to the packaging or part thereof, or provided by uncovering an area on the packaging or part thereof that bears the transaction code.

17. A system as disclosed in claim 2, wherein communication between the checkout unit and the article dispensing device is selected from the group consisting of:
ultrasound transmission,
electro-optical transmission,
rf transmission,
bluetooth transmission
wired transmission, transmission via a retailer's or trader's central computer unit and general merchandise transaction control unit.

18. A system as disclosed in claim 2, wherein the checkout unit includes a transaction code encoder device and a scanner device for scanning the non-validated token, wherein the scanner device is for communicating said information to the encoder device, the checkout unit communicating with the article dispensing device via said token encoder device, wherein the token encoder device transmits said information to a cash register in said checkout unit for processing during a payment receipt operation, and wherein the encoder device also has a control unit for controlling a printer for the issue of the validated article token, and a transmitting device to transmit said communication relating to said first transaction code to the article dispensing device.

19. A system as disclosed in claim 2, wherein the second transaction code on the validated token is entered in the comparator device through machine reading of the transaction code, said machine being selected from the group consisting of:
OCR reader,
optical scanner for scanning a bar code or an EAN code,
an electromagnetic magnetic strip reader,
an IC chip reader,
a punched hole reader, and
an rf label code reader.

20. A system as disclosed in claim 2, wherein the article dispensing device has a manually operated device selected from the group consisting of a keypad, keyboard and touch screen for input of a manually readable transaction code on the validated token into the comparator unit.

21. A system as disclosed in claim 2, wherein the first transaction code which is communicated to the article dispensing device and the second transaction code provided on the validated token are the same codes or codes that are related to each other, and are selected from the group consisting of complementary codes, symmetrical codes and unsymmetrical codes.

22. A system as disclosed in claim 2, wherein the article type information is selected from the group consisting of: a numerical code, a bar code, an EAN code, a UPC code, a magnetically readable code, an rf label readable code, and a manually interpretable article identification code.

23. A system as disclosed in claim 2, wherein the article type information is additionally selected from the group consisting of: animation of the article, article name, and article price.

24. A system as disclosed in claim 2, wherein the second transaction code is selected from the group consisting of:
   a numerical code, a bar code, an EAN code, a UPC code, a magnetically readable code, an rf label readable code, a series of numbers, a series of letters, a series of a combination of numbers and letters, at least one row of punched holes, a programmable IC chip, and a pre-programmed IC chip.

25. A system as disclosed in claim 2, wherein the selection panel on the selection panel device is a touch screen.

26. A system as disclosed in claim 2, wherein the validated token includes the packaging for the article that is to be dispensed or a part of said packaging.

27. A system as disclosed in claim 2, wherein the second transaction code on the validated token is on the processing thereof in the checkout unit applicable to the packaging or part thereof, transmittable to the packaging or part thereof, or provided by uncovering an area on the packaging or part thereof that carries the transaction code.

28. A system as disclosed in claim 2, wherein the checkout unit includes a transaction code encoder device and a scanner device for scanning the non-validated token, wherein the scanner device is for communicating information to the encoder device, said checkout unit communicating with the article dispensing device via said token encoder device, wherein said token encoder device transmits said information to a cash register in said checkout unit for processing during a payment receipt operation, wherein the encoder device is cooperative with a token dispenser which provides tokens with said second transaction code for validation by scanning in the checkout unit, and wherein said encoder device controls a transmitting device to transmit said first transaction codes to the article dispensing device.

29. A system as disclosed in claim 3, wherein the second transaction code is selectively available from the group consisting of:
   a numerical code, a bar code, an EAN code, a UPC code, a magnetically readable code, an rf label readable code, a series of numbers, a series of letters, a series of a combination of numbers and letters, at least one row of punched holes, a programmable IC chip , and a pre-programmed IC chip.

30. A system as disclosed in claim 4, wherein the second transaction code is selectively available from the group consisting of:
   a numerical code, a bar code, an EAN code, a UPC code, a magnetically readable code, an rf label readable code, a series of numbers, a series of letters, a series of a combination of numbers and letters, at least one row of punched holes, a programmable IC chip , and a pre-programmed IC chip.

* * * * *